(12) United States Patent
Miyashita et al.

(10) Patent No.: US 9,671,875 B2
(45) Date of Patent: Jun. 6, 2017

(54) INFORMATION PROCESSING DEVICE, INFORMATION PROCESSING METHOD AND PROGRAM

(71) Applicant: SONY CORPORATION, Tokyo (JP)

(72) Inventors: Ken Miyashita, Tokyo (JP); Atsushi Izumihara, Tokyo (JP); Yoshihito Ohki, Tokyo (JP); Yasushi Okumura, Tokyo (JP); Fuminori Homma, Tokyo (JP); Akemi Tazaki, Tokyo (JP); Shoichiro Moriya, Tokyo (JP)

(73) Assignee: Sony Corporation, Tokyo (JP)

( * ) Notice: Subject to any disclaimer, the term of this patent is extended or adjusted under 35 U.S.C. 154(b) by 506 days.

(21) Appl. No.: 13/743,627

(22) Filed: Jan. 17, 2013

(65) Prior Publication Data

US 2013/0207894 A1    Aug. 15, 2013

(30) Foreign Application Priority Data

Feb. 10, 2012 (JP) ................................. 2012-026966

(51) Int. Cl.
| | | |
|---|---|---|
| G09G 1/00 | (2006.01) | |
| G06F 3/0346 | (2013.01) | |
| G06F 1/16 | (2006.01) | |
| G06F 3/03 | (2006.01) | |
| G06F 3/0484 | (2013.01) | |

(52) U.S. Cl.
CPC .......... *G06F 3/0346* (2013.01); *G06F 1/1626* (2013.01); *G06F 1/1686* (2013.01); *G06F 3/0304* (2013.01); *G06F 3/0484* (2013.01); *G06F 2203/04806* (2013.01)

(58) Field of Classification Search
CPC ................................... G06F 13/00; G06F 3/00
See application file for complete search history.

(56) References Cited

U.S. PATENT DOCUMENTS

| | | | | |
|---|---|---|---|---|
| 7,607,111 B2* | 10/2009 | Vaananen | ............. | G06F 1/1626 345/156 |
| 2005/0001815 A1 | 1/2005 | Tsunoda | | |
| 2006/0187196 A1* | 8/2006 | Underkoffler et al. | ....... | 345/156 |
| 2007/0067798 A1* | 3/2007 | Wroblewski | .......... | G06F 3/0346 725/37 |

FOREIGN PATENT DOCUMENTS

| | | |
|---|---|---|
| JP | 2003-511786 | 3/2003 |
| JP | 2003-099808 | 4/2003 |

(Continued)

OTHER PUBLICATIONS

Jan. 19, 2016, Japanese Office Action for related JP Application No. 2012-026966.

(Continued)

*Primary Examiner* — Michael Faragalla
(74) *Attorney, Agent, or Firm* — Paratus Law Group, PLLC

(57) ABSTRACT

There is provided an information processing device including a movement information acquisition part acquiring information which is based on movement of an operation device, and a control information generation part generating, based on the information, control information for changing a display status continuously in a non-linear manner according to the movement.

15 Claims, 7 Drawing Sheets

(56) References Cited

FOREIGN PATENT DOCUMENTS

| | | | |
|---|---|---|---|
| JP | 2004-534302 | 11/2004 | |
| JP | 2008-065837 | 3/2008 | |
| JP | 2008-277605 | 9/2008 | |
| JP | 2009-259254 | * 11/2009 | ............ G06F 3/033 |
| JP | 2010-176170 | 8/2010 | |
| JP | 2010-538400 | 12/2010 | |
| WO | WO2009/116663 A1 | 9/2009 | |

OTHER PUBLICATIONS

Jun. 21, 2016, Japanese Office Action for related JP Application No. 2012-026966.
Uwakubo, "The Development of Educational Environment using 3-D Graphics Viewer", NEC, Nov. 11, 1993.
Dec. 27, 2016, CN communication issued for related application No. 201310038482.5.

* cited by examiner

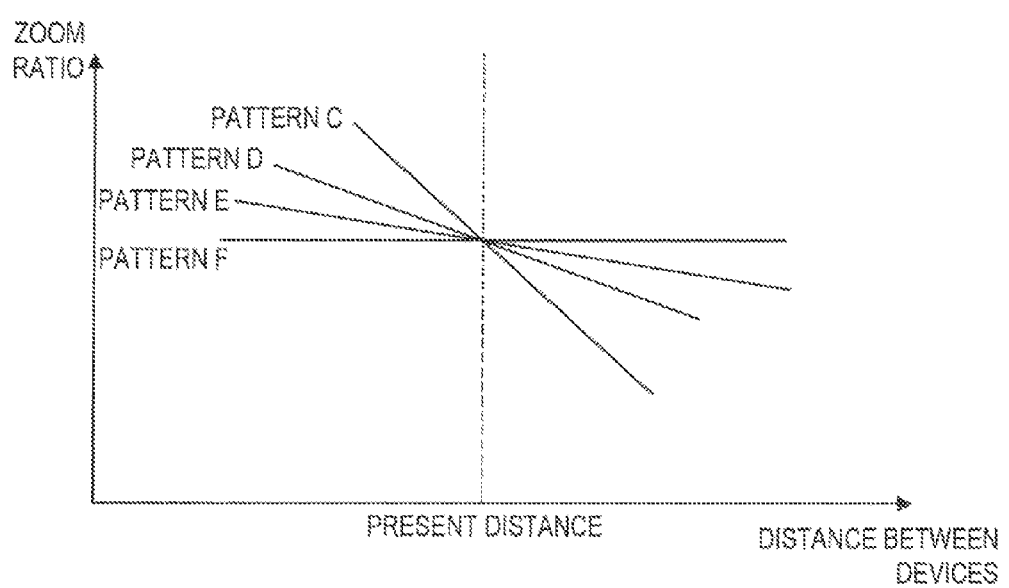

INFORMATION PROCESSING DEVICE, INFORMATION PROCESSING METHOD AND PROGRAM

BACKGROUND

The present disclosure relates to an information processing device, an information processing method and a program.

Techniques of displaying a part of a large image on a mobile device at hand are known recently. For example, Japanese Patent Laid-Open No. 2009-259254 describes that a marker is recognized from a moving image captured by a camera built in a mobile phone using an augmented reality technology, and thereby, that a spatial movement amount of the device is estimated to change a display region of the content.

SUMMARY

However, in the technology described in the above-mentioned official literature, the spatial movement amounts of the mobile phone in the real space are mapped on the changes of the display region of the content as they are. Therefore, when a zoom ratio is to be changed in a large range according to the movement amount of the mobile phone, for example, even a small spatial movement results in large change in zoom ratio. Hence, it is difficult to adjust the zoom ratio as the user wants.

Therefore, it has been desired to display information that the user wants efficiently according to movement of the device.

According to an embodiment of the present disclosure, there is provided an information processing device including a movement information acquisition part acquiring information which is based on movement of an operation device, and a control information generation part generating, based on the information, control information for changing a display status continuously in a non-linear manner according to the movement.

Further, the information processing device may include a display part; and a display controller controlling display in the display part based on the control information.

Further, the information processing device may include a storage holding a characteristic representing relationship between a movement amount and the display status. The control information generation part may generate the control information based on the characteristic.

Further, the information processing device may include a characteristic adjustment part dynamically changing the characteristic.

Further, the information processing device may include a sensor detecting an orientation of the information processing device. The characteristic adjustment part may dynamically change the characteristic according to the orientation of the information processing device.

Further, the control information generation part may generate the control information in a manner that the display status does not change according to the movement, when an orientation of the information processing device is a predetermined orientation, when a movement amount is smaller than a predetermined value, or when a predetermined operation input is received.

Further, the information processing device may include an image capturing part capturing an image of a subject. The display part may display at least the image captured by the image capturing part.

Further, the control information generation part may generate the control information for changing a zoom ratio of display.

Further, the control information generation part may generate the control information for changing a position of a cross section of display.

Further, according to an embodiment of the present disclosure, there is provided an information processing method including acquiring information which is based on movement of an operation device, and generating, based on the information, control information for changing a display status continuously in a non-linear manner according to the movement.

Further, according to an embodiment of the present disclosure, there is provided a program for causing a computer to function as a mechanism acquiring information which is based on movement of an operation device, and a mechanism generating, based on the information, control information for changing a display status continuously in a non-linear manner according to the movement.

According to the present disclosure, information that the user wants can be displayed efficiently according to movement of the device.

BRIEF DESCRIPTION OF THE DRAWINGS

FIG. 7 is a schematic diagram illustrating processing of dynamically adjusting the graph.

DETAILED DESCRIPTION OF THE EMBODIMENTS

Figure 1:
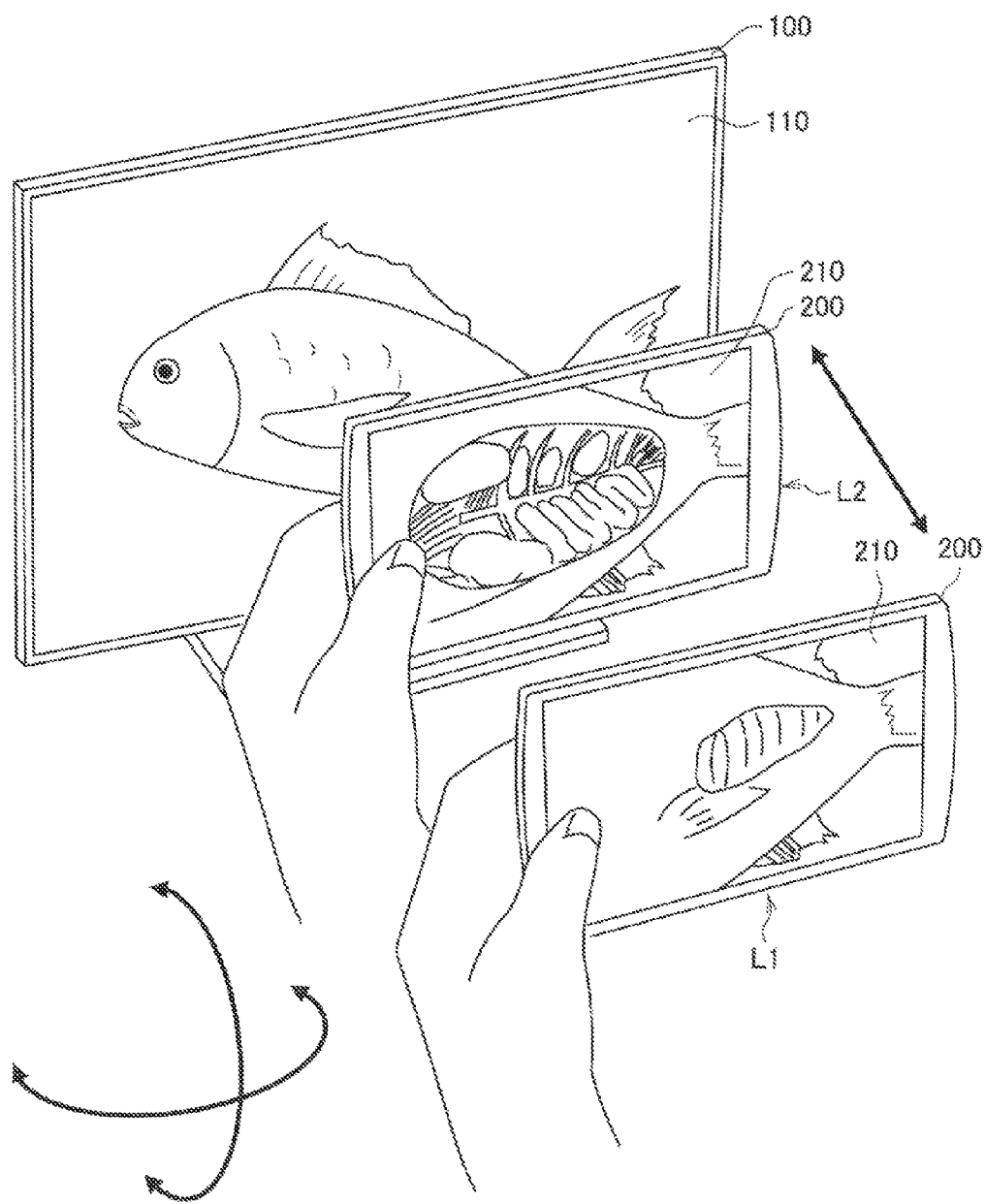
FIG. 1 is a schematic diagram illustrating an overview of a system according to one embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Incidentally, the description is made in the following order.

1. Overview of System According to Embodiment
2. System Configuration According to Embodiment
3. Algorithm According to Embodiment
4. Specific Example of Changing Zoom Ratio According to Distance between Devices
5. Specific Example of Dynamically Adjusting Graph
6. Example of Processing Solely Performed by Mobile Device 7. Example of Locking Display on Display Part 1. Overview of System According to Embodiment At first, an overview of a system according to one embodiment of the present disclosure is described with reference to FIG. 1. The embodiment relates to a technology of changing the degree of precision (zoom ratio and the like) of information displayed, according to a distance between two devices. FIG. 1 is a schematic diagram illustrating an overview of a system according to the embodiment. FIG. 1 illustrates an example of its application to a system for explaining an anatomical drawing of a fish. As illustrated in FIG. 1, the system according to the embodiment can be configured of two devices (a display device 100 which is fixedly situated and a mobile device 200). The display device 100 displays an overview of information. In the example illustrated in FIG. 1, an overview of one fish is displayed on a display part 110 of the display device 100. The system illustrated in FIG. 1 can be utilized as a teaching material in school, for example. In this case, one display device 100 is disposed in a classroom, for example, students use individual mobile devices 200, and thereby, each can have the mobile device 200 perform display thereon as they want.

The mobile device 200 is a device allowing the user to move its position. The mobile device 200 is relevant to an "operation object" according to the present disclosure. The "operation object" is a device whose spatial position and/or posture change in response to operation of the user and which gives inputs to a predetermined device according to the change in position and/or posture. The "operation object" may be a device such as a spatial remote controller other than the mobile device 200. The mobile device 200 includes a camera (image capturing part 240, not shown in FIG. 1) and a display part 210, and can capture an image of information displayed on the display device 100 to display at least part of the information on the display part 210. When the user moves the position of the mobile device 200, content of the information displayed on the mobile device 200 changes according to the change of relative positional relationship between the display device 100 and mobile device 200.

As illustrated in FIG. 1, when the user moves the position of the mobile device 200 back and forth (in the depth direction), a zoom ratio of the display screen of the display part 210 changes. Specifically, the zoom ratio becomes larger as the mobile device 200 gets closer to the display device 100, and thus, the image on the display part 210 is enlarged and displayed. Moreover, the zoom ratio becomes smaller as the mobile device 200 goes further away from the display device 100, and thus, the image in the display screen is shrunk and displayed.

Moreover, in the example illustrated in FIG. 1, a cross section of the fish displayed on the display device 100 is displayed on the display part 210 of the mobile device 200. In the example illustrated in FIG. 1, when the user moves the position of the mobile device 200 back and forth (in the depth direction), the position of the cross section changes in displaying. At a position L1 illustrated in FIG. 1, a cross section at a position relatively shallow from the surface of the fish is displayed. Moreover, at a position L2, the mobile device 200 has moved more toward the display device 100 side, and a cross section at a position deeper from the surface of the fish (position of the internal organs) is displayed. Thus, as the user moves the mobile device 200 back and forth, the position of the cross section displayed on the mobile device 200 also changes back and forth. Accordingly, the user can see cross sections at desired positions by moving the mobile device 200.

In addition, changing the zoom ratio or changing the position of the cross section according to the position of the mobile device 200 can be determined according to the content displayed on the display device 100. Moreover, change in display status according to the position of the mobile device 200 is not limited to these, but an in-focus position (position in focus) of the display object in the depth direction may also be changed, for example, according to the position of the mobile device 200. Moreover, a playback speed of a moving image may also be changed according to the position of the mobile device 200.

Moreover, the mobile device 200 may also solely display the content. In this case, the mobile device 200 changes the zoom ratio or cross-sectional position or the like of the content displayed on the display part 210 according to the change in the position of its own device.

2. System Configuration According to Embodiment

Figure 2:
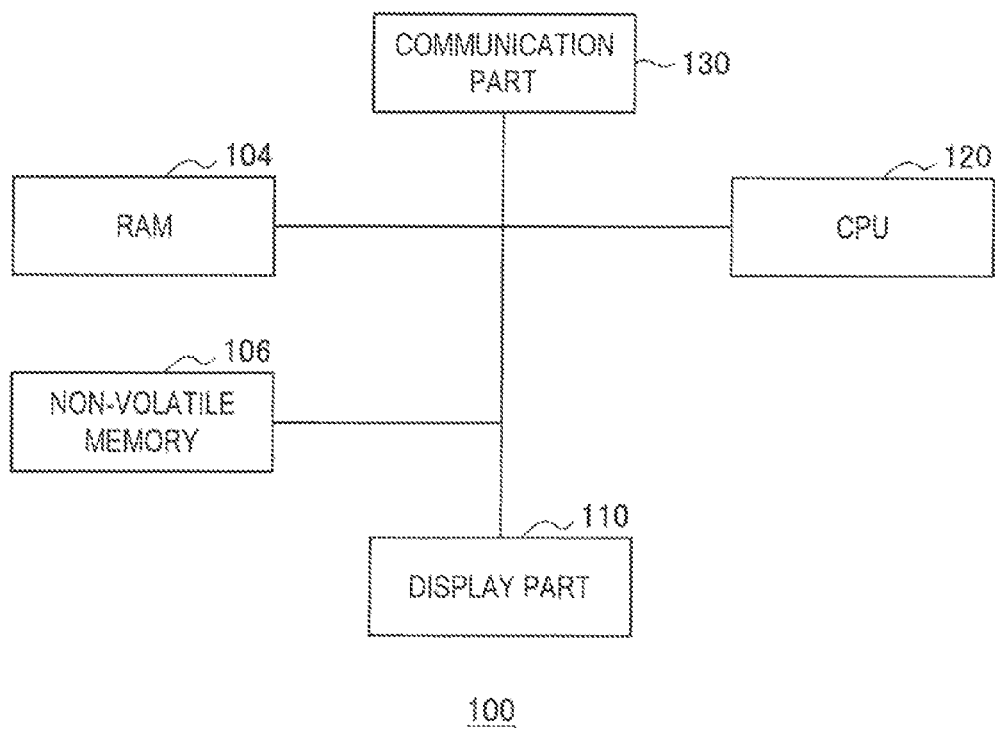
FIG. 2 is a block diagram illustrating a configuration of a display device.
Figure 3:
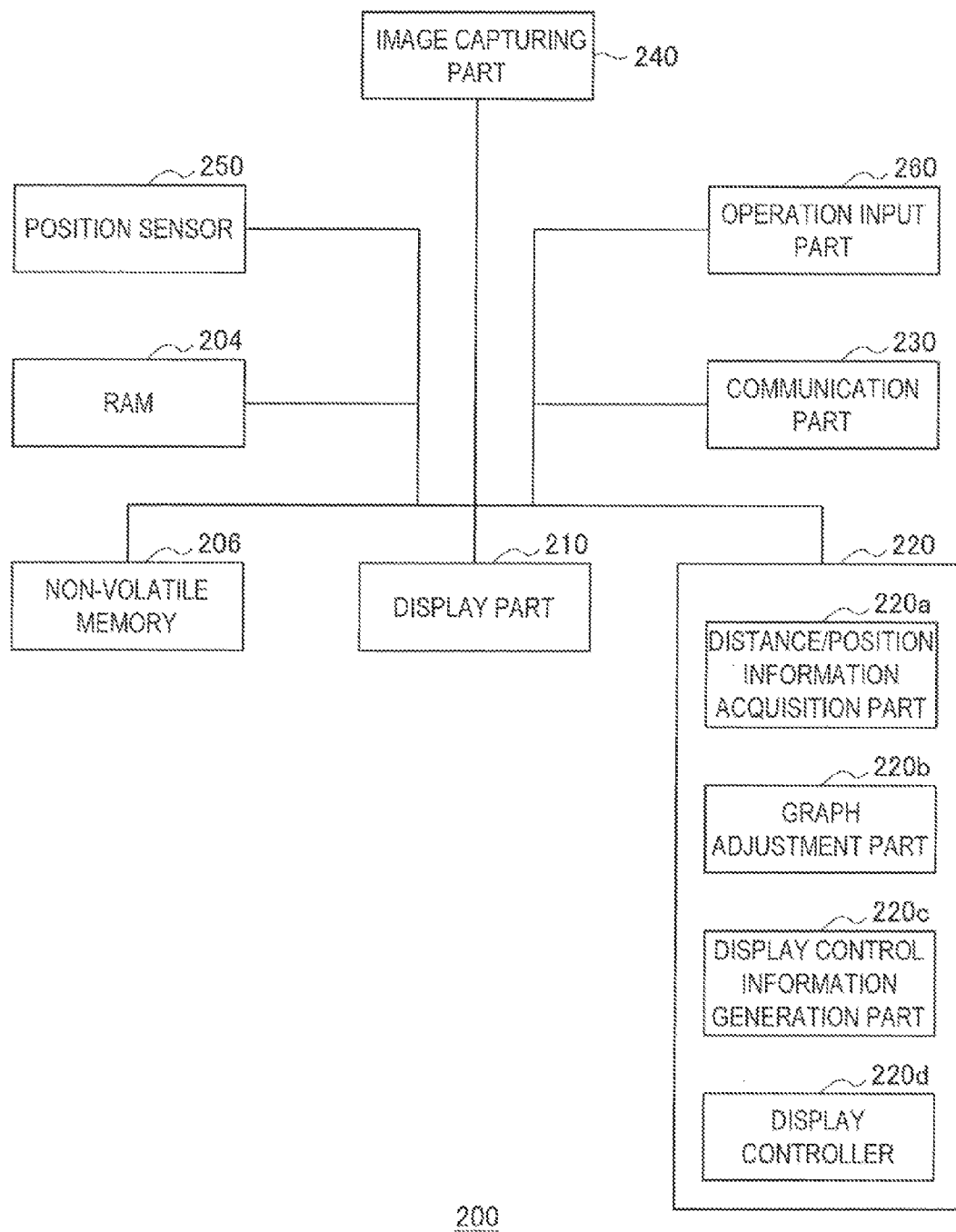
FIG. 3 is a block diagram illustrating a configuration of a mobile device

FIG. 2 is a block diagram illustrating a configuration of the display device 100. Moreover, FIG. 3 is a block diagram illustrating a configuration of the mobile device 200. As illustrated in FIG. 2, the display device 100 is configured to include a RAM 104, a non-volatile memory 106, the display part 110, a CPU 120 and a communication part 130. The CPU 120 of the display device 100 displays image data stored in the RAM 104 or non-volatile memory 106 on the display part 110. The communication part 130 can transmit information regarding the image displayed on the display part 110 to the mobile device 200 via wireless communication.

As illustrated in FIG. 3, the mobile device 200 is configured to include a RAM 204, a non-volatile memory 206, the display part 210, a CPU 220, a communication part 230, the image capturing part (camera) 240, a position sensor 250 and an operation input part 260. The position sensor 250 includes a GPS, an accelerometer, a tilt sensor such as a gyro sensor, and the like, and can detect the position, movement amount and tilt (posture) of the mobile device 200.

Under the configurations illustrated in FIG. 2 and FIG. 3, the image capturing part 240 of the mobile device 200 captures an image of the display part 110 of the display device 100. Information obtained by the image capturing is displayed on the display part 210 by a display controller 220d of the CPU 220. Moreover, the image capturing part 240 of the mobile device 200 captures an image of identification information such as a marker displayed on the display part 110 of the display device 100. Moreover, the communication part 230 receives information regarding the image displayed on the display part 110 from the display device 100.

The CPU 220 of the mobile device 200 includes a distance/position information acquisition part 220a, a graph adjustment part (characteristic adjustment part) 220b, a display control information generation part 220c and the display controller 220d. The distance/position information acquisition part 220a acquires information regarding a distance between itself and the display device 100 and a position and an orientation of the mobile device 200 based on identification information such as a marker whose image is captured by the image capturing part 240 and information obtained from the sensor 250. Namely, the distance/position information acquisition part 220a functions as a movement information acquisition part acquiring general information regarding movement of the mobile device 200. The graph adjustment part 220b dynamically changes characteristics of a graph mentioned later based on parameters such as the position and orientation of the mobile device 200. The display control information generation part 220c generates control information for controlling display content of the display part 210 (the zoom ratio, the position of the cross section and the like) based on information such as the distance between the mobile device 200 and display device 100 and the position and orientation of the mobile device 200. The display controller 220d controls the display content on the display part 210 based on the control information. The individual constituents of the CPU 220 can be configured of the CPU 220 and programs (software) for causing the CPU 220 to operate. In this case, the programs can be stored in a memory such as the RAM 204 and non-volatile memory 206 of the mobile device 200 or a recording medium connected from the outside.

In addition, the configuration of the CPU 220 may be included in a device (server or the like) different from the mobile device 200. In this case, the mobile device 200 transmits the information acquired by the image capturing part 240 and/or sensor 250 to the relevant different device, receives the processing results of the CPU 220, and thereby, can change the display content on the display part 210.

3. Algorithm According to Embodiment

Figure 4:
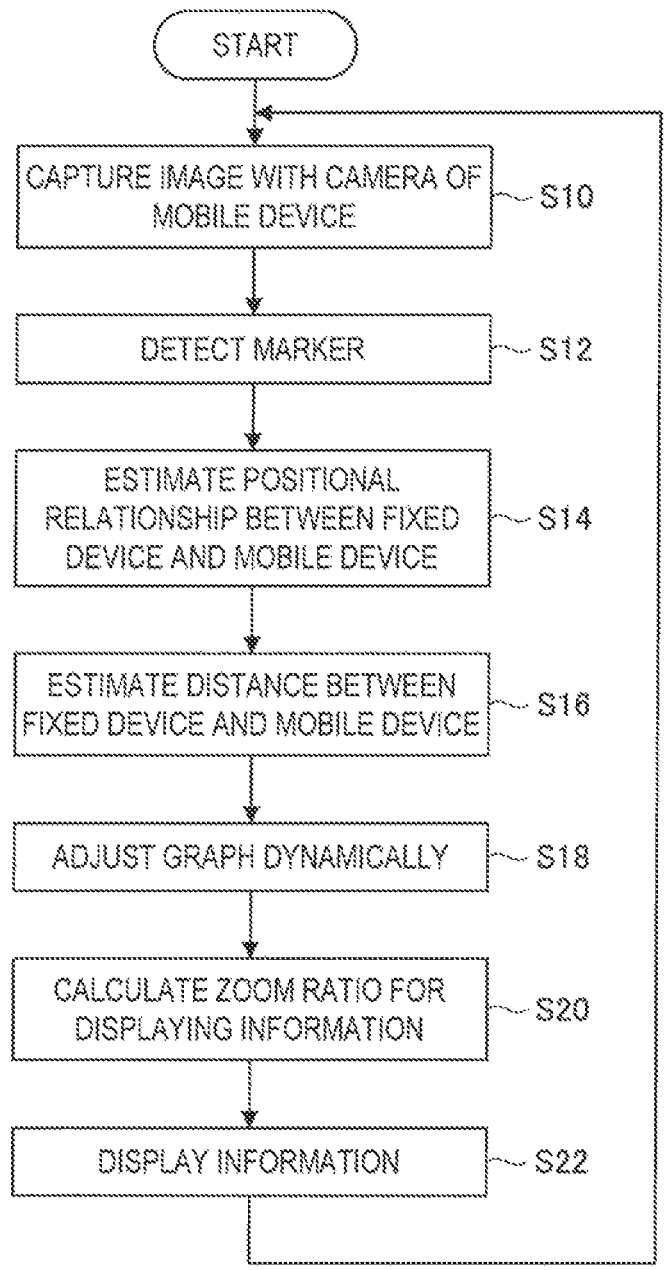
FIG. 4 is a flowchart illustrating an algorithm for determining information content displayed on the mobile device (zoom ratio) according to relative positional relationship between the display device and the mobile device.

FIG. 4 is a flowchart illustrating algorithm for determining information content (zoom ratio) displayed on the mobile device 200 according to relative positional relationship between the display device 100 and mobile device 200. At first, the mobile device 200 captures an image of an appearance in front thereof (display part 110 of the display device 100) using the camera 240 (step S10). The display device 100 displays an explicit marker such as a QR code or a beforehand registered non-marker object on the screen. Herein, the beforehand registered non-marker object is a marker capable of being recognized by a markerless recognizer, for example. As one example, the non-marker object can be a figure of 2 cm square. The mobile device 200 detects the above-mentioned marker or non-marker object from the captured image (step S12). Then, the mobile device 200 detects relative positional relationship between the display device 100 and mobile device 200 based on the detected marker or non-marker object (step S14), and furthermore, detects the distance (step S16). The distance/position information acquisition part 220a of the CPU 220 beforehand acquires the size and shape of the marker or non-marker object, and thereby, can acquire the relative positional relationship and distance between the display device 100 and mobile device 200 based on information of the marker or non-marker object whose image is captured by the image capturing part 240. Next, the mobile device 200 dynamically adjusts a graph illustrated in FIG. 5 (step S18). The mobile device 200 calculates a zoom ratio in displaying information according to the distance between the detected two devices (step S20). Finally, the mobile device 200 displays the information according to the calculated zoom ratio (step S22).

Figure 5:
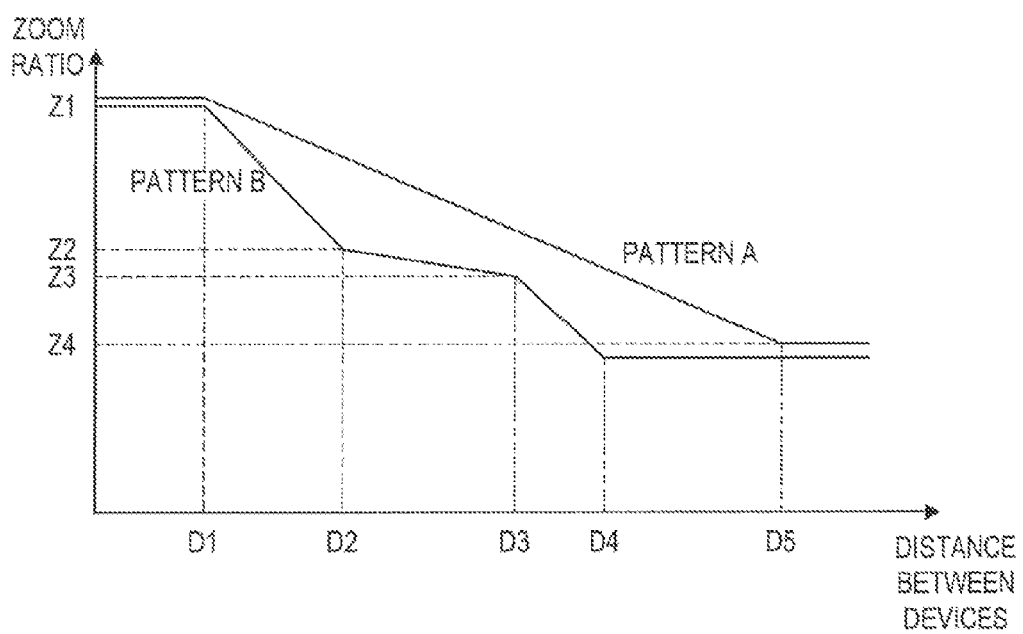
FIG. 5 is a graph for determining a zoom ratio of information displayed on the mobile device according to a distance between the display device and the mobile device.

4. Specific Example of Changing Zoom Ratio According to Distance Between Devices FIG. 5 illustrates a graph (characteristics diagram) for determining a zoom ratio of information displayed on the mobile device 200 according to a distance between the display device 100 and mobile device 200. Herein, two patterns A and B are described, exemplifying the anatomical drawing of a fish described in FIG. 1. The patterns A and B are stored in the non-volatile memory 206 of the mobile device 200. The display control information generation part 220c of the CPU 220 generates control information based on these patterns stored in the non-volatile memory 206. In FIG. 5, the horizontal axis indicates a distance between the devices (between the display device 100 and mobile device 200) and the vertical axis indicates a zoom ratio.

At first, the pattern A in FIG. 5 indicates a pattern in which the zoom ratio changes regularly proportional to the distance between the two devices. In this case, when the distance between the devices is 0 or more and D1 or less, the zoom ratio is the highest of Z1 and the inside of the body of the fish is enlarged and displayed down to the most detailed portion. When the distance between the devices is D1 or more and D5 or less, the zoom ratio changes regularly from Z1 to Z4 according to the distance between the devices, and the larger the distance becomes, the more the zoom ratio decreases. Moreover, when the distance between the devices is D5 or more, the zoom ratio is the lowest of Z4 and the mobile device 200 displays the whole appearance of the one fish.

Next, the pattern B in FIG. 5 is a characteristic pattern of the embodiment, and indicates a pattern in which a certain partial region inside the body of the fish, that is, a certain range of the zoom ratio is to be shown intensively. In this case, change in zoom ratio according to the distance between the devices is non-linear. When the distance between the devices is 0 or more and D1 or less, the zoom ratio is the highest of Z1 and the inside of the body of the fish is enlarged and displayed down to the most detailed portion. When the distance between the devices is D1 or more and D4 or less, the zoom ratio decreases not uniformly in conformity with the characteristics of the pattern B in the graph according to the distance between the devices. In the case of the pattern B, when the distance between the devices is D2 or more and D3 or less, the zoom ratio hardly changes even in the change of the distance between the devices. On the other hand, when the distance between the devices is D1 or more and D2 or less, or D3 or more and D4 or less, the zoom ratio changes largely as the distance between the devices changes. Thereby, when the distance between the devices is D2 or more and D3 or less, information in the zoom ratio from Z2 to Z3 can be intensively shown for the user even when the position of the mobile device 200 changes. When the distance between the devices is D4 or more, the zoom ratio is the lowest of Z4 and the mobile device 200 displays the whole appearance of the one fish. In addition, the characteristics of the pattern B in FIG. 5 can be changed according to content displayed on the display part 210. Moreover, the pattern B in FIG. 5 has the characteristics in polygonal line shape, whereas it may have characteristics in which curves are connected smoothly.

As the pattern B, distances between the devices are categorized into several ranges and an inclination of the graph is changed for the individual ranges. Thereby, content in a certain specific zoom ratio or in its vicinity can be displayed preferentially. In case of an anatomical drawing of a human body or a fish or the like, for example, the change in zoom ratio is made at its minimum or the zoom ratio is fixed regardless of the distance between the devices in a range of the zoom ratio where organs of importance such as a stomach and intestines are displayed properly. Thereby, the display can be made preferentially in the zoom ratio for the portions of importance.

On the other hand, when regions of not much importance are displayed, the change in zoom ratio according to the distance between the devices is made large. Thereby, portions of special importance can be shown intensively for the user recognizing them.

Figure 6:
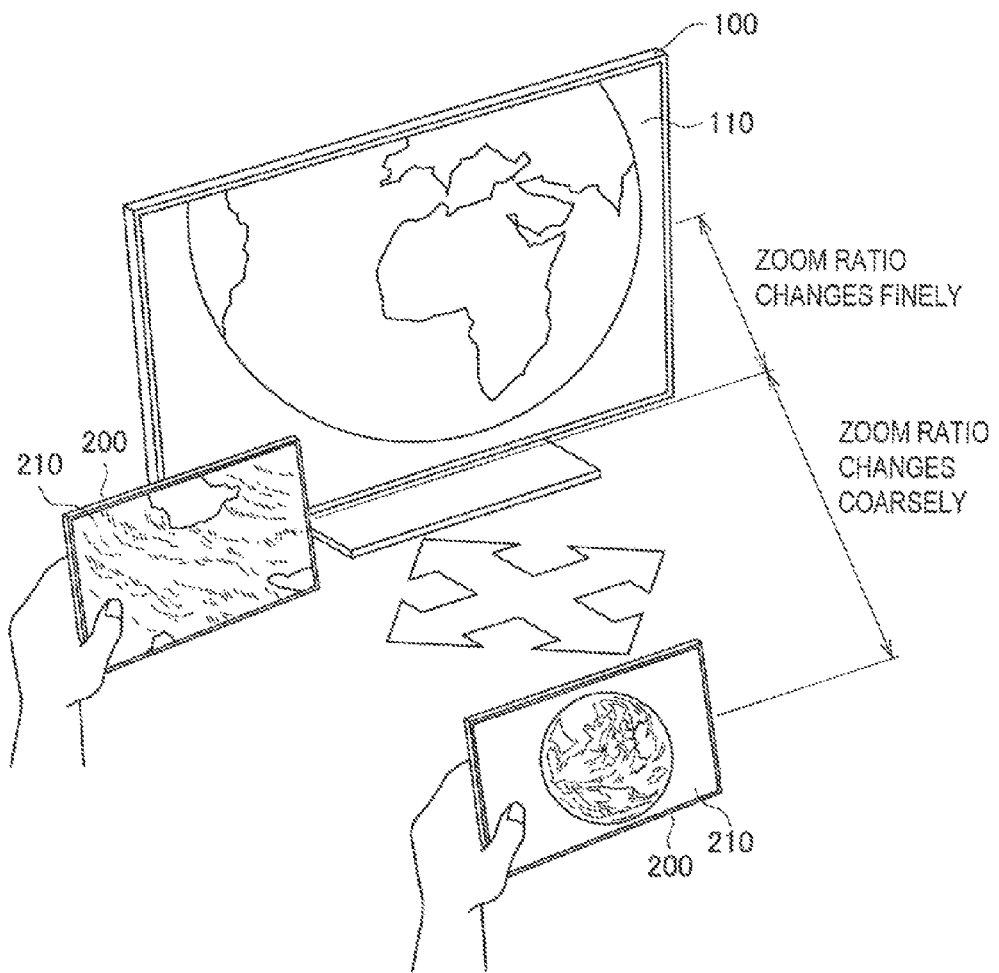
FIG. 6 is a schematic diagram illustrating a situation in case of realizing, using the technology according to the embodiment, a system for learning an appearance on the earth interactively.

By the configurations as above, the embodiment can be applied to a lot of situations under which the user sees content, being controlling the mobile device 200 at hand. FIG. 6 is a schematic diagram illustrating a situation in case of realizing, using the technology according to the embodiment, a system for learning an appearance on the earth interactively. When moving the mobile device 200 back and forth, the zoom ratio continuously changes from a zoom ratio in which the surface of the earth is seen at a height of 10 m to a zoom ratio in which the whole earth is seen from space. Herein, in a system of learning during a class of social studies in school, for example, when learning the Japanese islands, it can be configured that a zoom ratio in which the entirety of the Japanese islands is displayed over the whole screen of the mobile device 200 is of preference, and that a change amount in zoom ratio according to change in distance between the devices is made small around the relevant zoom ratio. Thereby, the user who is learning can learn efficiently since the change in zoom ratio can be suppressed in the state that the Japanese islands as a learning object is displayed.

5. Specific Example of Dynamically Adjusting Graph

As mentioned above, in step S18 of FIG. 4, the graph illustrated in FIG. 5 is adjusted dynamically. This adjustment is performed by the graph adjustment part 220b based on information regarding the orientation of the mobile device 200 acquired by the distance/position information acquisition part 220a of the CPU 220. FIG. 7 is a schematic diagram illustrating processing of dynamically adjusting the graph. Similarly to FIG. 5, the horizontal axis in FIG. 7 indicates a distance between the devices and the vertical axis indicates a zoom ratio. For example, the graph in FIG. 5 is adjusted such that change in zoom ratio according to the distance between the devices is made small, when the user moves the display plane of the display part 210 of the mobile device 200 from perpendicular to level. This is realized by being changing the graph, for example, from the pattern C via the pattern D to the pattern E in FIG. 7, as the tilt of the mobile device 200 is closer to the level, or proportional to a time period of being level. Thereby, the user can configure the change in zoom ratio for portions of importance to the desired state by adjusting the orientation of the mobile device 200. Accordingly, interaction effective for the user can be obtained by dynamically adjusting the graph.

6. Example of Processing Solely Performed by Mobile Device

In the above description, the system including the display device 100 and mobile device 200 is described, whereas the mobile device 200 can solely perform the similar processing. The CPU 220 of the mobile device 200 can display image data stored in the RAM 204 or non-volatile memory 206 on the display part 210. Herein, as mentioned above, the mobile device 200 can acquire information regarding the position and movement of the mobile device 200 itself based on information obtained from the image capturing part 240 or position sensor 250. Accordingly, the mobile device 200 can change information displayed on the display part 210 based on the information. In the case of the mobile device 200 alone, the CPU 220 can change the zoom ratio according to a position of the mobile device 200 by setting the horizontal axis of the graph illustrated in FIG. 5 as the "positions of the mobile device 200" and performing the processing similar to the above.

7. Example of Locking Display on Display Part

When the mobile device 200 is in a predetermined state, change of the display can be locked. For example, when the mobile device 200 is inclined by a predetermined angle or more and the display screen of the display part 210 faces upward, the change of the display can be locked. This adjustment is performed by the graph adjustment part 220b based on information regarding the orientation of the mobile device 200 acquired by the distance/position information acquisition part 220a of the CPU 220. The pattern F illustrated in FIG. 7 illustrates characteristics in the case of the change of the display being locked. In this case, even when the mobile device 200 is moved back and forth, content displayed on the display part 210 before the locking is displayed on the display part 210 as it is. Thereby, display status of the information displayed on the display part 210 (zoom position, cross-sectional position and the like) does not change, and therefore, the user can see and recognize the information displayed on the display part 210 in the desired display status. Moreover, by resuming the tilt of the mobile device 200 as it was, the user can again be changing the display status while moving the mobile device 200 back and forth. Similarly, when the user shakes the mobile device 200, the change of the display can also be locked, the distance/position information acquisition part 220a detecting the shake.

Moreover, when no movement of the mobile device 200 for a predetermined time or more is detected, display status of the display part 210 can be locked. For example, when the movement amount of the mobile device 200 within a predetermined time is a predetermined value or less, the display status is locked. In this case, since the position of the mobile device 200 dose not change for a predetermined time or more, it is estimated that the user has the mobile device 200 rest in the display status of its preference. Accordingly, by locking the display status of the display part 210, the display which the user wants can be performed continuously. Furthermore, it is also possible to lock the display status when the user performs predetermined operation onto the operation input part 260 of the mobile device 200.

In the case of locking the display status, the graph adjustment part 220b of the CPU 220 performs configuration change from the normal state to the state of the pattern F illustrated in FIG. 7 based on the posture of the mobile device 200, change in movement and operation of the user.

As described above, according to the embodiment, display status of the display part 210 is changed in a non-linear manner in response to movement of the mobile device 200, and therefore, portions of importance for the user can be displayed intensively. Accordingly, information can be efficiently provided for the user.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An information processing device including:
a movement information acquisition part acquiring information which is based on movement of an operation device; and
a control information generation part generating, based on the information, control information for changing a display status continuously in a non-linear manner according to the movement.

(2) The information processing device according to (1), further including:
a display part; and
a display controller controlling display in the display part based on the control information.

(3) The information processing device according to (1), further including a storage holding a characteristic representing relationship between a movement amount and the display status, wherein the control information generation part generates the control information based on the characteristic.

(4) The information processing device according to (3), further including a characteristic adjustment part dynamically changing the characteristic.

(5) The information processing device according to (4), further including a sensor detecting an orientation of the information processing device, wherein the characteristic adjustment part dynamically changes the characteristic according to the orientation of the information processing device.

(6) The information processing device according to (1), wherein the control information generation part generates the control information in a manner that the display status does not change according to the movement, when an orientation of the information processing device is a predetermined orientation, when a movement amount is smaller than a predetermined value, or when a predetermined operation input is received.

(7) The information processing device according to (2), further including an image capturing part capturing an image of a subject, wherein the display part displays at least the image captured by the image capturing part.

(8) The information processing device according to (1), wherein the control information generation part generates the control information for changing a zoom ratio of display.

(9) The information processing device according to (1), wherein the control information generation part generates the control information for changing a position of a cross section of display.

(10) An information processing method including:

acquiring information which is based on movement of an operation device; and generating, based on the information, control information for changing a display status continuously in a non-linear manner according to the movement.

(11) A program for causing a computer to function as:

a mechanism acquiring information which is based on movement of an operation device; and a mechanism generating, based on the information, control information for changing a display status continuously in a non-linear manner according to the movement.

The present disclosure contains subject matter related to that disclosed in Japanese Priority Patent Application JP 2012-026966 filed in the Japan Patent Office on Feb. 10, 2012, the entire content of which is hereby incorporated by reference.

What is claimed is:

1. An information processing device comprising:
a movement information acquisition part acquiring information which is based on movement of an operation device; and
a control information generation part generating, based on the information, control information for changing a three-dimensional content of a display continuously according to the movement of the operation device,
wherein the movement of the operation device comprises an orientation change of the operation device and a position change of the operation device,
wherein a displayed hierarchical layer of the content of the display is changed based on a distance between the operation device and a predetermined spatial location so as to display external and internal structure information of the content,
wherein the control information generation part generates the control information for changing a zoom ratio of the display based on the movement of the operation device, and
wherein the movement information acquisition part and the control information generation part are each implemented via at least one processor.

2. The information processing device according to claim 1, further comprising:
a display part; and
a display controller controlling display in the display part based on the control information.

3. The information processing device according to claim 1, further comprising
a storage holding a characteristic representing relationship between a movement amount and the display status,
wherein the control information generation part generates the control information based on the characteristic.

4. The information processing device according to claim 3, further comprising
a characteristic adjustment part dynamically changing the characteristic,
wherein the characteristic adjustment part is implemented via at least one processor.

5. The information processing device according to claim 4, further comprising
a sensor detecting an orientation of the information processing device,
wherein the characteristic adjustment part dynamically changes the characteristic according to the orientation of the operation device.

6. The information processing device according to claim 1,
wherein the control information generation part generates the control information in a manner that the display status does not change according to the movement, when an orientation of the operation device is a predetermined orientation, when a movement amount is smaller than a predetermined value, or when a predetermined operation input is received.

7. The information processing device according to claim 2, further comprising
an image capturing part capturing an image of a subject,
wherein the display part displays at least the image captured by the image capturing part, and
wherein the image capturing part is implemented via at least one processor.

8. The information processing device according to claim 1,
wherein the control information generation part generates the control information for changing a position of a cross section of display.

9. An information processing method, the method being executed via at least one processor, and comprising:
acquiring information which is based on movement of an operation device; and
generating, based on the information, control information for changing a zoom ratio of a three-dimensional content of a display continuously according to the movement of the operation device,
wherein the movement of the operation device comprises an orientation change of the operation device and a position change of the operation device, and wherein a displayed hierarchical layer of the content of the display is changed based on a distance between the operation device and a predetermined spatial location so as to display external and internal structure information of the content.

10. A non-transitory computer-readable storage medium storing a program which, when executed by a computer, causes the computer to execute a method, the method comprising:
acquiring information which is based on movement of an operation device; and
generating, based on the information, control information for changing a zoom ratio of a three-dimensional content of a display continuously according to the movement of the operation device,
wherein the movement of the operation device comprises an orientation change of the operation device and a position change of the operation device, and
wherein a displayed hierarchical layer of the content of the display is changed based on a distance between the operation device and a predetermined spatial location so as to display external and internal structure information of the content.

11. The information processing device according to claim 6, wherein the orientation of the operation device is a tilt of the operation device by a predetermined angle.

12. The information processing device according to claim 6, wherein the orientation of the operation device is a shaking of the operation device.

13. The information processing device according to claim 1, wherein a cross section of the content of the display is changed based on the distance between the operation device and a predetermined spatial location.

14. The information processing device according to claim 1, wherein the orientation change of the operation device comprises tilting the operation device.

15. The information processing device according to claim 1, wherein the zoom ratio of the three-dimensional content of the display changes based on importance of the content.

* * * * *